Patented Dec. 9, 1952

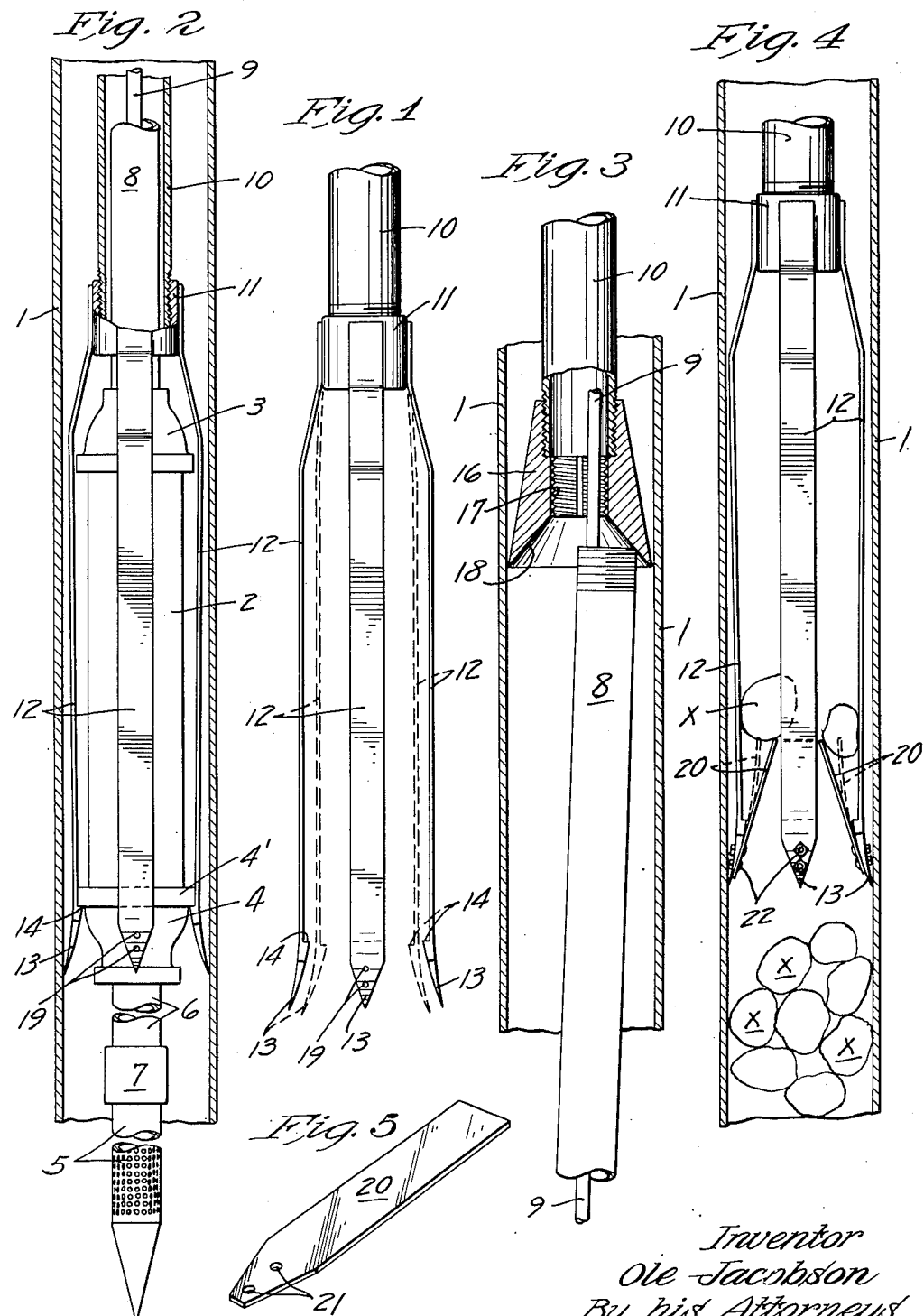

2,621,067

UNITED STATES PATENT OFFICE 2,621,067

DEVICE FOR REMOVING EXTRANEOUS MATTER FROM WELL SHAFTS

Ole Jacobson, Cumberland, Wis.

Application September 1, 1949, Serial No. 113,596

1 Claim. (Cl. 294—99)

My invention relates to a fishing tool for use in recovering of lost pump or drill rods, pipes or other objects from cased wells.

The primary object of the invention is the provision of a fishing tool having a plurality of elongated relatively flat hook-equipped fingers which may be used successfully to extract well cylinders from well casings.

Another object of my invention is the provision of a device, as set forth, which may be easily adjusted to well casings of various sizes.

Still another object of my invention is the provision of flexible resilient barb elements which may be secured to said resilient fingers for removing foreign matter, such as stones and the like, from well casings.

A still further object of my invention is the provision of a device, as set forth, which is simple and inexpensive to manufacture, which is rugged in construction and which is efficient and durable in use.

The above and still further highly important objects and advantages of my invention will become apparent from the following specification, appended claim and attached drawings.

Referring to the drawings, in which like characters indicate like parts throughout the several views:

Fig. 1 is a fragmentary view in side elevation of my improved fishing tool;

Fig. 2 is a fragmentary vertical section of a well casing illustrating the use of my novel fishing tool in removing a well cylinder therefrom;

Fig. 3 is a fragmentary vertical section of a well casing showing an attachment for my novel fishing tool and the use thereof;

Fig. 4 is a fragmentary vertical section through the well casing showing my novel fishing tool with resilient flexible barb elements attached to the lower ends of the resilient fingers of my device; and Fig. 5 is a view in perspective of one of the flexible resilient barbs of Fig. 4.

Referring particularly to the embodiment of the invention illustrated in Figs. 1 and 2, the numeral 1 indicates a cylindrical well casing having contained therein a well pump cylinder 2 having upper and lower end caps 3 and 4, respectively. A water intake element 5 is secured to the lower end of cap 4 by means of conventional piping 6 and pipe coupling 7. The usual well pipe 8 extends upwardly from the upper end cap 3 and a pump or sucker rod 9 is shown as extending upwardly therethrough.

My novel fishing tool comprises a tubular element 10 screw-threaded at its lower end to receive an internally screw-threaded collar 11. The tubular member 10 preferably is made up of a plurality of pipe sections connected by conventional pipe couplings, not shown, in the same manner as a well casing or a well pipe. This arrangement permits the use of a tubular member 10 of the proper length for the particular job.

A plurality of circumferentially spaced gripping fingers 12 have their upper ends secured to the collar 11 and extend generally in a direction axially thereof. The upper end portions of the fingers 12 may be secured to the collar 11 by any suitable means, but are preferably welded or brazed thereto. The fingers 12 are relatively flat and are preferably made of steel, a substantial portion thereof just below the collar 11 being in an annealed state so as to be ductile. Preferably, the ductile portion extends about one-quarter or one-third of the length of the fingers. The remaining lower portion of each of the fingers 12 is tempered to impart hardness and resiliency thereto. At their lower ends, the fingers 12 flare downwardly and outwardly and are preferably formed with converging side edges to provide points 13. By reference to Figs. 1 and 2, it will be seen that each of the fingers 12 is formed to provide an upwardly opening hook element 14 in spaced relation to the point 13 thereof. The hook elements 14 are located on the radially inner surfaces of the fingers 12 and are preferably at the same horizontal level.

When it is desired to remove a broken or damaged piece of equipment such as a well cylinder 2 from the well, my improved fishing tool is inserted into the well casing 1 and moved downwardly beyond either the upper end cap or the lower end cap 4 thereof, the well pipe 8 or pump rod 9 being contained within the tubular member 10. It will be noted that the lower flaring ends 13 engage the inner wall of the casing 1. The resilience of the relatively flat fingers 12 permits sufficient bending thereof to allow the hook elements 14 to pass between the inner wall of the casing 1 and in laterally projected portions of the end caps 3 and 4, which lessen the clearance therebetween and the wall of the casing 1. When the hook elements 14 have passed any such projections, such as, for instance, the flange 4' of the lower end cap 4, the resilience of the fingers 12 will cause the hook elements 14 to move radially inwardly to points underlying the flange 4'. Subsequent raising of the tubular member 10 will cause the hook elements 14 to engage the flange 4' so that the well cylinder 2 and parts connected thereto will be raised from the well casing 1.

As indicated in Fig. 1, the ductility of the upper end portions of the fingers 12 permits of adjustment thereof in directions radially of the axis of the tubular member 10, as shown by dotted lines. Thus my novel fishing tool may be readily adjusted to accommodate well casings of various diameters. The hook elements 14 are adapted to engage any radially outwardly projecting portion of the well pumping or drilling equipment such as threaded portions of a well or drill pipe or couplings thereon. In the event of screw-threads on the upper end of a well pipe 8 becoming damaged, I provide an attachment for repairing the damaged threads without removing the pipe 8 from the casing 1, see particularly Fig. 3. This attachment comprises a collar 16 adapted to be screw-threaded onto the lower end of the tubular member 10 and having screw-thread-cutting means, such as a self-contained die 17, intermediate its upper and lower ends. The collar 16 is provided with a downwardly and outwardly flaring inner wall 18 which, under downward movement of the collar 16 with respect to the well pipe 8, exerts a camming action upon the upper end of the pipe section 8 to center the pipe section in the thread-cutting means 7. Rotation of the tubular member 10 and the collar 16 will then cause the thread-cutting means 17 to work on the damaged threads of the pipe 8 and recut the same.

Figs. 4 and 5 illustrate a second attachment for my novel fishing tool and the use thereof in extricating foreign matter, such as stones and the like, from a well casing. It will be seen, by reference to Figs. 1 and 2, that the lower end portions of the arms 12 are provided with apertures 19. I provide a plurality of flexible resilient barb elements 20, one each adapted to be secured to the lower end portion of one of the fingers 12. It will be observed that each barb 20 is provided with a pair of apertures 21 alignable with the apertures 19 in the fingers 12. The barbs are rigidly secured to the pointed end portions 13 of each of the fingers 12 by means of nut-equipped bolts or the like 22 passing through the aligned apertures 19 and 21.

The barbs are mounted so as to project upwardly and radially inwardly with respect to the fingers 12, see Fig. 4. When it is desired to utilize these attachments for removing stones (indicated by the letter $x$) or like foreign matter from a well casing, it is but necessary to drop the fishing tool thus equipped into the well casing and force the barb-equipped points 13 downwardly below the level of the stone $x$. The resilient barbs 20 will be moved radially outwardly, as indicated by dotted lines in Fig. 4, permitting passage of the lower ends of the fingers below the uppermost of the stones $x$. When the barbs 20 have passed below a substantial number of stones $x$, the fishing tool is then drawn upwardly. The resilient nature of the barbs 20 causes them to be moved to their full line position of Fig. 4, thus trapping a substantial number of stones $x$ thereabove between the fingers 12.

My improved fishing tool has been thoroughly tested commercially and has met with considerable success in extricating various objects from well casings in instances where other fishing tools and equipment have failed.

While I have shown a commercial embodiment and modified forms of my novel device, it will be understood that the same is capable of further modification without departure from the scope and spirit of the invention as defined in the claim.

What I claim is:

A device for removing extraneous matter from well shafts comprising an elongated tubular element, a collar removably secured to the lower end of the tubular element, a plurality of fingers in the form of elongated flat strips having their upper ends secured to said collar in uniform circumferentially spaced relation, said strips initially comprising major lower portions parallel with the axis of said collar and minor upper portions converging from the upper ends of said major portions to the periphery of said collar, said strips in the regions of said converging portions being ductile to permit adjustment thereof radial of said axis and the strips being resilient in their lower major portions, the lower ends of said strips having thickened wedge shaped tips edgewise thereof, said tips having downwardly diverging outer walls, the inner walls of the tips converging upwardly toward said axis and terminating in generally horizontal hook-like shelves, said tips sidewise thereof tapering downwardly to terminal points, and resilient barbs disposed within the lower end portions of the strips and converging upwardly and having their lower ends removably secured to said inner walls of said tips.

OLE JACOBSON.

REFERENCES CITED

The following references are of record in the file of this patent:

UNITED STATES PATENTS

| Number | Name | Date |
| --- | --- | --- |
| 987,242 | Kohler | Mar. 21, 1911 |
| 1,000,817 | Kemper | Aug. 15, 1911 |
| 1,171,315 | Bryant | Feb. 8, 1916 |
| 1,298,702 | Harshaw | Apr. 1, 1919 |
| 1,315,581 | Scott | Sept. 9, 1919 |
| 1,462,099 | Brown | July 17, 1923 |
| 1,470,114 | Erwin | Oct. 9, 1923 |
| 1,498,172 | Keever | June 17, 1924 |
| 1,509,001 | Smith | Sept. 16, 1924 |
| 1,824,191 | Black et al. | Sept. 22, 1931 |